United States Patent
King

(10) Patent No.: US 7,049,792 B2
(45) Date of Patent: *May 23, 2006

(54) METHOD AND APPARATUS FOR A HYBRID BATTERY CONFIGURATION FOR USE IN AN ELECTRIC OR HYBRID ELECTRIC MOTIVE POWER SYSTEM

(75) Inventor: Robert Dean King, Schenectady, NY (US)

(73) Assignee: General Electric Company, Schenectady, NY (US)

(*) Notice: Subject to any disclaimer, the term of this patent is extended or adjusted under 35 U.S.C. 154(b) by 102 days.

This patent is subject to a terminal disclaimer.

(21) Appl. No.: 10/823,200

(22) Filed: Apr. 12, 2004

(65) Prior Publication Data

US 2004/0189226 A1 Sep. 30, 2004

Related U.S. Application Data

(62) Division of application No. 10/191,790, filed on May 29, 2001, now Pat. No. 6,737,822, which is a division of application No. 09/190,069, filed on Nov. 12, 1998, now Pat. No. 6,331,365.

(51) Int. Cl.
*H02J 7/00* (2006.01)
(52) U.S. Cl. ........................ 320/126; 320/104
(58) Field of Classification Search ........... 320/126, 320/132; 429/9
See application file for complete search history.

(56) References Cited

U.S. PATENT DOCUMENTS

| | | | |
|---|---|---|---|
| 3,899,041 A | 8/1975 | Mager | |
| 4,025,860 A | 5/1977 | Shibata et al. | |
| 4,056,764 A | 11/1977 | Endo et al. | |
| 4,066,936 A | 1/1978 | Hirota | |
| 5,196,275 A | 3/1993 | Goldman et al. | |
| 5,237,258 A | 8/1993 | Crampton | |
| 5,291,106 A | 3/1994 | Murty et al. | |
| 5,373,195 A | 12/1994 | De Doncker et al. | |
| 5,592,067 A | 1/1997 | Peter et al. | |
| 5,659,240 A | 8/1997 | King | |
| 5,710,699 A | 1/1998 | King et al. | |

(Continued)

FOREIGN PATENT DOCUMENTS

EP 0424577 10/1989

(Continued)

*Primary Examiner*—Pia Tibbits
(74) *Attorney, Agent, or Firm*—Ann M. Agosti

(57) ABSTRACT

A power system for an electric motor drive such as may be used in an electrically propelled vehicle incorporates the combination of a high power density battery and a high energy density battery to provide an optimal combination of high energy and high power, i.e., a hybrid battery system. The hybrid battery system in one form includes components which prevent electrical recharge energy from being applied to the high energy density battery while capturing regenerative energy in the high power density battery so as to increase an electric vehicle's range for a given amount of stored energy. A dynamic retarding function for absorbing electrical regenerative energy is used during significant vehicle deceleration and while holding speed on down-hill grades, to minimize mechanical brake wear and limit excessive voltage on the battery and power electronic control devices. The high energy density battery coupled in circuit with a boost converter, a high power density battery, a dynamic retarder, and an AC motor drive circuit. The hybrid battery system is controlled by a hybrid power source controller which receives signals from a vehicle system controller using current and voltage sensors to provide feedback parameters for the closed-loop hybrid battery control functions.

6 Claims, 9 Drawing Sheets

U.S. PATENT DOCUMENTS

| | | |
|---|---|---|
| 5,780,980 A | 7/1998 | Naito |
| 5,847,533 A | 12/1998 | Hakala et al. |
| 5,883,496 A * | 3/1999 | Esaki et al. ................. 320/132 |
| 5,898,282 A | 4/1999 | Drozdz et al. |
| 5,903,449 A | 5/1999 | Garrigan et al. |
| 5,995,396 A | 11/1999 | Bryne et al. |
| 5,998,885 A | 12/1999 | Tamor et al. |
| 5,998,960 A | 12/1999 | Yamada et al. |
| 6,031,294 A | 2/2000 | Geis et al. |
| 6,321,145 B1 | 11/2001 | Rajashekara |
| 6,331,365 B1 * | 12/2001 | King ............................. 429/9 |

FOREIGN PATENT DOCUMENTS

| | | |
|---|---|---|
| GB | 2275378 | 8/1994 |

* cited by examiner

METHOD AND APPARATUS FOR A HYBRID BATTERY CONFIGURATION FOR USE IN AN ELECTRIC OR HYBRID ELECTRIC MOTIVE POWER SYSTEM

This application is a division of application Ser. No. 10/191,790 filed May 29, 2001 now U.S. Pat No. 6,737,822, which is a division of 09/190,069 filed Nov. 12 1998, now U.S. Pat. No. 6,331,365 issued Dec. 18, 2001, which is hereby incorporated by reference in its entirety.

BACKGROUND

The present invention relates to a battery power control system, and more specifically, to a low-cost configuration and control method for a hybrid battery system which achieves both high energy density and high power density for use in an electric or hybrid electric motor drive system such as used in electrically propelled vehicles.

Propulsion systems for electric motor propelled vehicles ("electric vehicle" or EV) generally use rechargeable traction batteries to provide electric power for driving electric motors coupled in driving relationship to wheels of the vehicle. For example, U.S. Pat. No. 5,373,195 illustrates a system in which the traction batteries are connected to a direct current (DC) link, which link connects to a power control circuit such as a pulse width modulation (PWM) circuit for controlling power to a DC motor or to a frequency controlled inverter for controlling power to an alternating current (AC) motor. Hybrid electric vehicle (HEV) propulsion systems are constructed similarly to EV propulsion systems but also include internal combustion engines to drive on-board generators to supplement battery power.

In general, traction batteries for electric vehicles and hybrid-electric vehicles represent a compromise between power density and energy density.

SUMMARY OF THE INVENTION

The present invention seeks to optimize the power system for an electrically propelled vehicle by the use of the combination of a high power density battery and a high energy density battery. For example, very high energy density battery technology exists in the form of, for example, zinc-air mechanically rechargeable batteries, which have been demonstrated to achieve energy densities of 200 W-hr/kg, compared to a lead-acid battery which typically achieves only 30–40 W-hr/kg. However, the power density of such zinc-air batteries is reported to be about 80–100 W/kg. In comparison, nickel-cadmium (Ni—Cd) batteries have been developed that achieve power densities of 350 W/kg with energy densities of 45–50 W-hr/kg. Accordingly, a hybrid battery system using a zinc-air battery in combination with a Ni—Cd battery would provide an optimal combination of high energy and high power.

One problem with using high energy density batteries in EV applications is that such batteries are not electrically rechargeable, i.e., a battery such as the zinc-air battery requires mechanical/electro-chemical recharging. Nevertheless, a system including both a high energy density battery and a high power density battery, which system would be both mechanically rechargeable and electrically rechargeable, where electrical recharge energy is not applied to the mechanically rechargeable segment of the battery would have substantial advantages in operating capacity. Further, such a hybrid battery system could include a method to capture regeneration energy in the hybrid battery configuration that would increase an EV's or HEV's range for a given amount of stored energy.

As discussed above, it is desirable to provide a low-cost configuration and control method for a hybrid battery system capable of achieving both high energy density and high power density in an electric or hybrid vehicle propulsion system. Towards this end, the present invention provides a method and apparatus to control the recharging of a hybrid battery which includes both a high energy density battery, such as a mechanically rechargeable battery, and a high power density battery.

The hybrid battery system in one form of the present invention includes components which prevent electrical recharge energy from being applied to the high energy density battery while being able to capture regenerative energy to be applied to the high power density battery so as to increase an electric vehicle's range for a given amount of stored energy. A dynamic retarding function for absorbing electrical regenerative energy is used during significant vehicle deceleration and while holding speed on down-hill grades, to minimize mechanical brake wear and limit excessive voltage on the battery and power electronic control devices.

In an illustrative embodiment, the present invention comprises a hybrid battery system, which includes a high energy density battery coupled in circuit with a boost converter, a high power density battery, a dynamic retarder, and an AC motor drive. The hybrid battery system is controlled by a hybrid power source controller which receives signals from a vehicle system controller. The hybrid power source controller uses current and voltage sensors to provide feedback parameters for the closed-loop hybrid battery control functions. Recharging the high power density battery is accomplished by a combination of capture of regenerative energy from the motor drive and recharge from the high energy density battery.

BRIEF DESCRIPTION OF THE DRAWINGS

The invention may be better understood by reference to the following description taken in conjunction with the accompanying drawings in which.

DETAILED DESCRIPTION OF THE INVENTION

Figure 1:
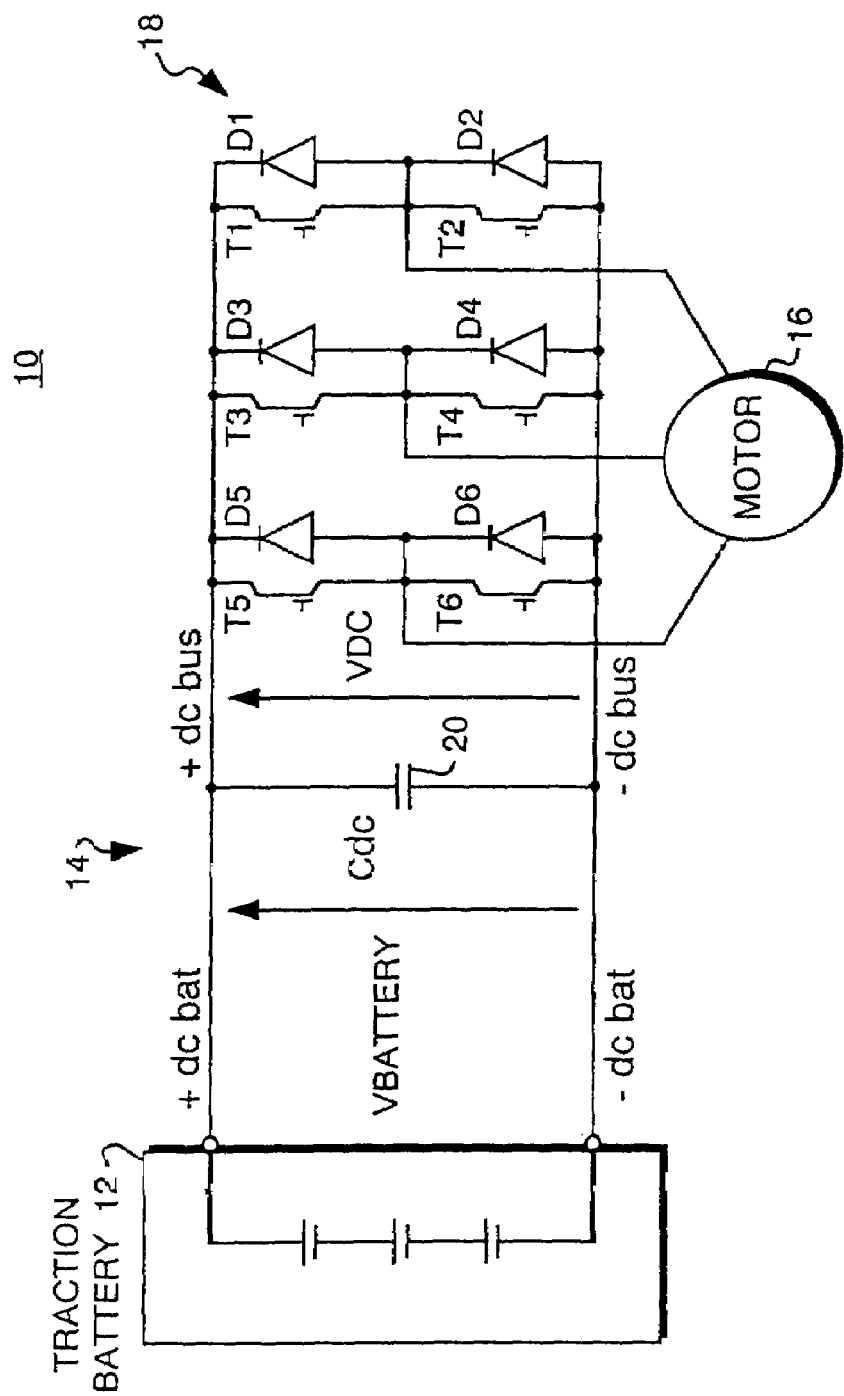
FIG. 1 schematically illustrates a conventional AC traction drive with DC-AC inverter and traction battery.

FIG. 1 schematically illustrates a conventional AC motor traction drive system 10 powered from an electrically rechargeable battery 12, such as a lead-acid or other high power density battery used in traction motor applications. The traction battery 12 is coupled to a DC link 14 which couples power to, or receives regenerative power from, an electric traction load or motor 16 coupled to the DC link 14 by a traction drive converter 18 shown as an inverter 18 for purposes of FIG. 1.

The motor 16 is shown as an alternating current (AC) motor requiring variable frequency excitation, which is derived from the DC link 14 by the inverter 18, but could be a direct current (DC) motor coupled to link 14 by a DC control circuit, such as a pulse width modulation (PWM) converter. The AC motor 16 may comprise any suitable type of AC machine including, for example, an induction machine, a permanent magnet synchronous machine, an electronically commutated motor or a switched reluctance motor. An input filter capacitor 20 of inverter 18 is coupled across the DC link 14 for filtering the voltage VDC on the DC link 14. Since the motor 16 is preferably a 3-phase machine, the inverter 14 is a 3-phase inverter having two series connected switching devices per phase leg, i.e., devices T1 and T2 form a first phase leg, devices T3 and T4 form a second phase leg and devices T5 and T6 form a third phase leg. The devices T1–T6 are conventional semiconductor switching devices such as, for example, IGBT, MOSFET, GTO, SCR or IGCT type devices. Diodes D1–D6 are coupled in anti-parallel relationship across respective ones of the switching devices T1–T6.

The traction battery 12 in the exemplary EV drive typically has a terminal voltage in excess of 300 V dc and can produce several hundred amperes of current for short periods of time. More specifically, the traction battery 12 for an electrical vehicle is typically sized for sufficient power density to meet vehicle acceleration and gradeability requirements. However, the energy densities for such batteries yield marginal range, which is the major reason that electric vehicles have not yet reached widespread acceptance.

Figure 2:
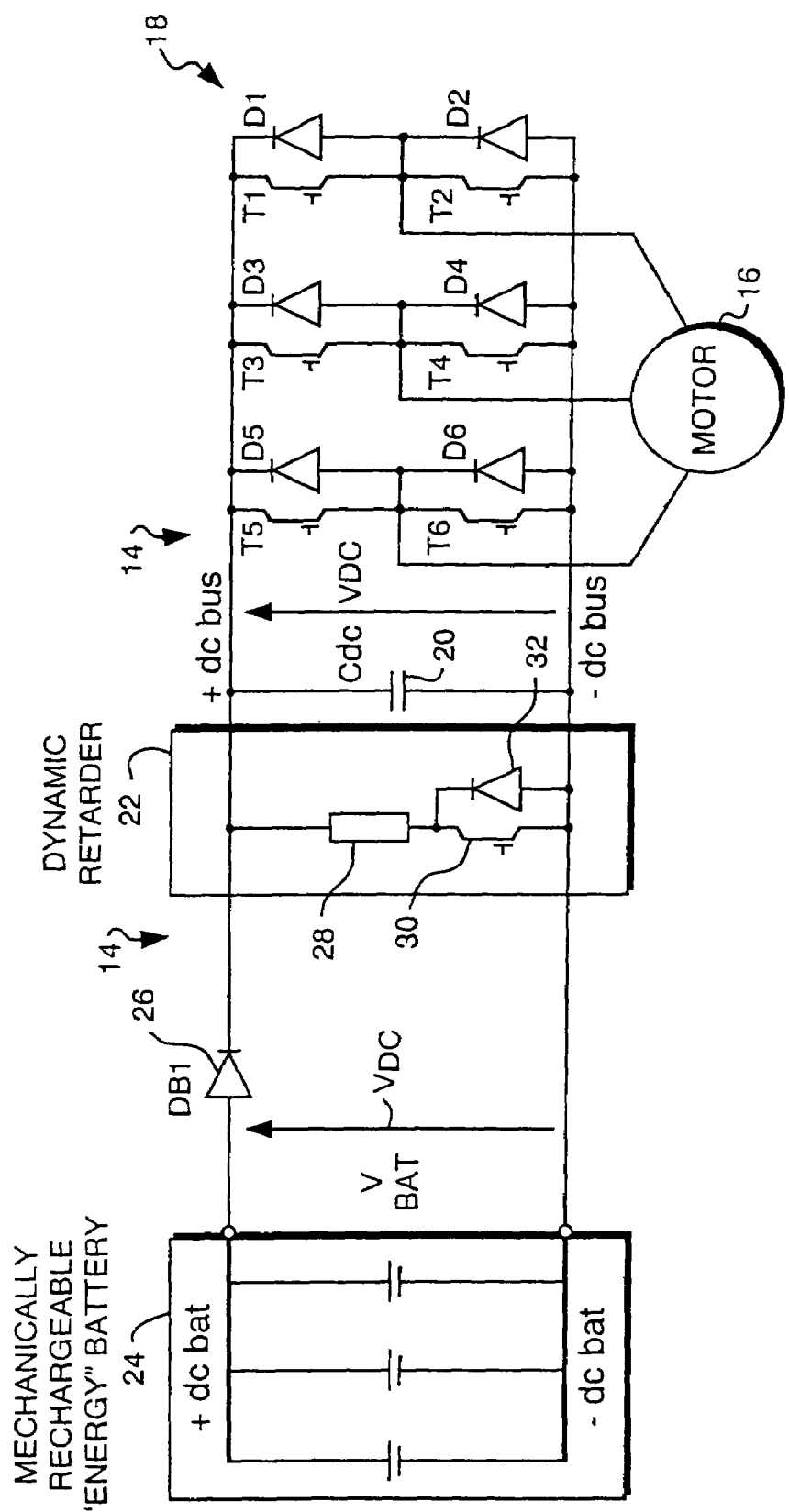
FIG. 2 schematically illustrates an AC traction drive according to one embodiment of the invention with a dynamic retarder and a mechanically rechargeable battery.

FIG. 2 schematically illustrates one embodiment of the present invention resulting in a modified version of the AC traction drive of FIG. 1 incorporating a dynamic retarder 22 which enables use of a high energy density battery 24 which, in the embodiment of FIG. 2 is a mechanically rechargeable battery. Battery 24 is coupled to the DC link 14 in place of the high power density, electrically rechargeable battery 12. The mechanically rechargeable battery 24, such as a zinc-air battery, may have an energy density of 200 W-hr/kg. However, such a battery can only supply power to the load and cannot receive regenerative energy during vehicle deceleration. For this reason, a unidirectional conductor shown for example as a diode 26 is connected in the positive bus of the DC link 14 between the mechanically rechargeable battery and the inverter 18 so as to preclude power flow to the mechanically rechargeable battery. The dynamic retarder 22 is coupled across the DC link 14 on the inverter 18 end of the link.

The dynamic retarder 22 comprises a high power dissipation grid resistor 28, and a serially connected switching device 30. A flyback diode 32 is connected in anti-parallel with device 30. The device 30 is operated in a pulse width modulation (PWM) mode so as to controllably vary the effective resistance impressed on the DC link 14 by the resistor 28 to thereby limit the DC voltage developed on link 14 when the motor 16 is operated in a regenerative mode returning electric power to the link through the inverter 18. The motor 16 can be operated in a regenerative mode by controlling the, conduction phase angle of the devices T1–T6. The regenerative mode allows the motor 16 to act as a load to retard or slow the vehicle and minimize wear and tear on the vehicle mechanical brakes. Additionally, accessories such as lights, air conditioners, and power steering pumps may be connected to the DC link and used to absorb regenerative energy.

Figure 3:
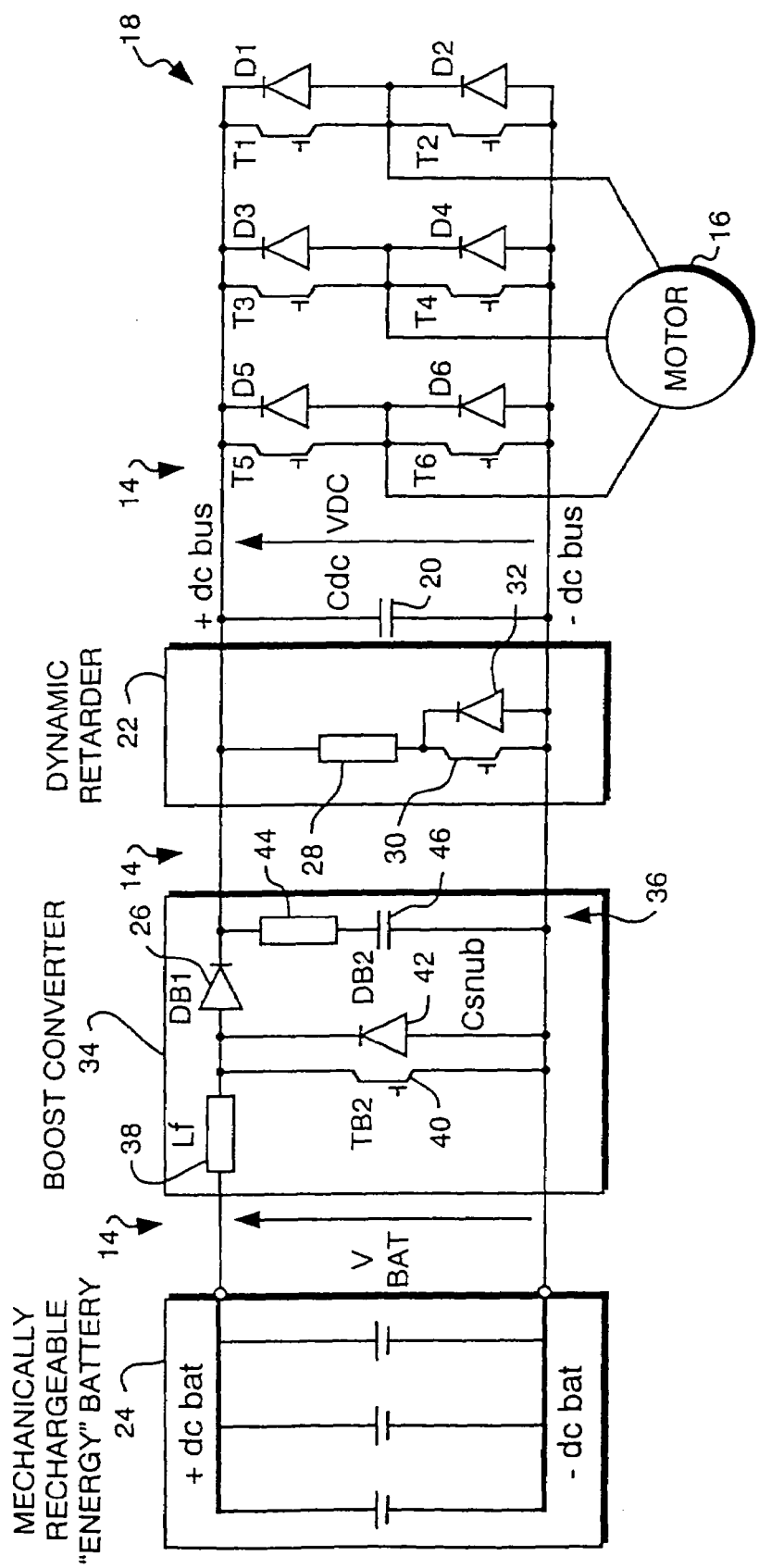
FIG. 3 schematically illustrates an AC traction drive according to another embodiment of the invention with a boost converter control, a dynamic retarder, and a mechanically rechargeable battery.

Turning now to FIG. 3, there is illustrated another embodiment of the present invention implemented as a further modification of the drive circuit of FIG. 2 incorporating a boost converter circuit 34 to boost the voltage available from the mechanically rechargeable high energy battery 24. The boost converter circuit 34 is a simplified version of that shown in U.S. Pat. No. 5,710,699 and essentially comprises an inductor 38 connected in the positive DC link voltage bus and a semiconductor switching device 40 connected cross the DC link. The term DC link 14 is used herein to refer to the positive and negative DC busses which have portions at different voltage levels due to boost converter 34 (and due to battery 48 in FIG. 4). Each of the portions is collectively included in DC link 14.

A reverse current diode 42 is connected in reverse polarity in parallel with the switching device 40. The boost converter 34 operates by gating the switching device 40 into conduction so as to effectively place the inductor 38 directly across the terminals of the battery 24. This action causes a rapid build up of current in the inductor. When the switching device 40 is then gated out of conduction, the inductive reactance of the inductor 38 forces the current to continue to flow in the same direction through the inductor so that the inductor acts as a current source creating a voltage across the combination of the battery 24 and inductor 38 which is greater than the battery voltage. This forces the current to continue through the series diode 26 and raises the effective voltage on the DC link 14. The reverse current diode 42 provides a current path for transient voltages when the device 40 is gated out of conduction so as to protect the device 40. This embodiment also includes a snubber circuit 36 connected across the DC link to limit transient voltages on the link. The snubber circuit may comprise the series combination of a resistor 44 and capacitor 46. The remainder of the drive circuit of FIG. 3 is essentially the same as shown in FIG. 2.

It will be noted that in the embodiment of FIG. 3, the blocking diode 26 is incorporated in the boost converter circuit 34. In some applications, it may be desirable to use a second diode in series between the circuit 34 and mechanically rechargeable battery 24. For example, referring to FIG. 6, there is shown a portion of the system of FIG. 3 using two blocking diodes 26 and 27, the diode 27 being a separate diode isolating the battery 24 from the circuit 34. The diode 26 remains in the boost converter circuit 34 but there is now included a controllable electronic switch 29 (such as a MOSFET, an IGBT or other switching device) connected in parallel with diode 26 and adapted for conducting current in anti-parallel direction around diode 26. This embodiment allows the boost converter 34 to act as a buck converter for regenerative power flow from the inverter 18 so that the regenerative power can be utilized for vehicle accessory power (AUX LOAD 31) rather than being dissipated as heat in the dynamic retarder 22.

Figure 8:
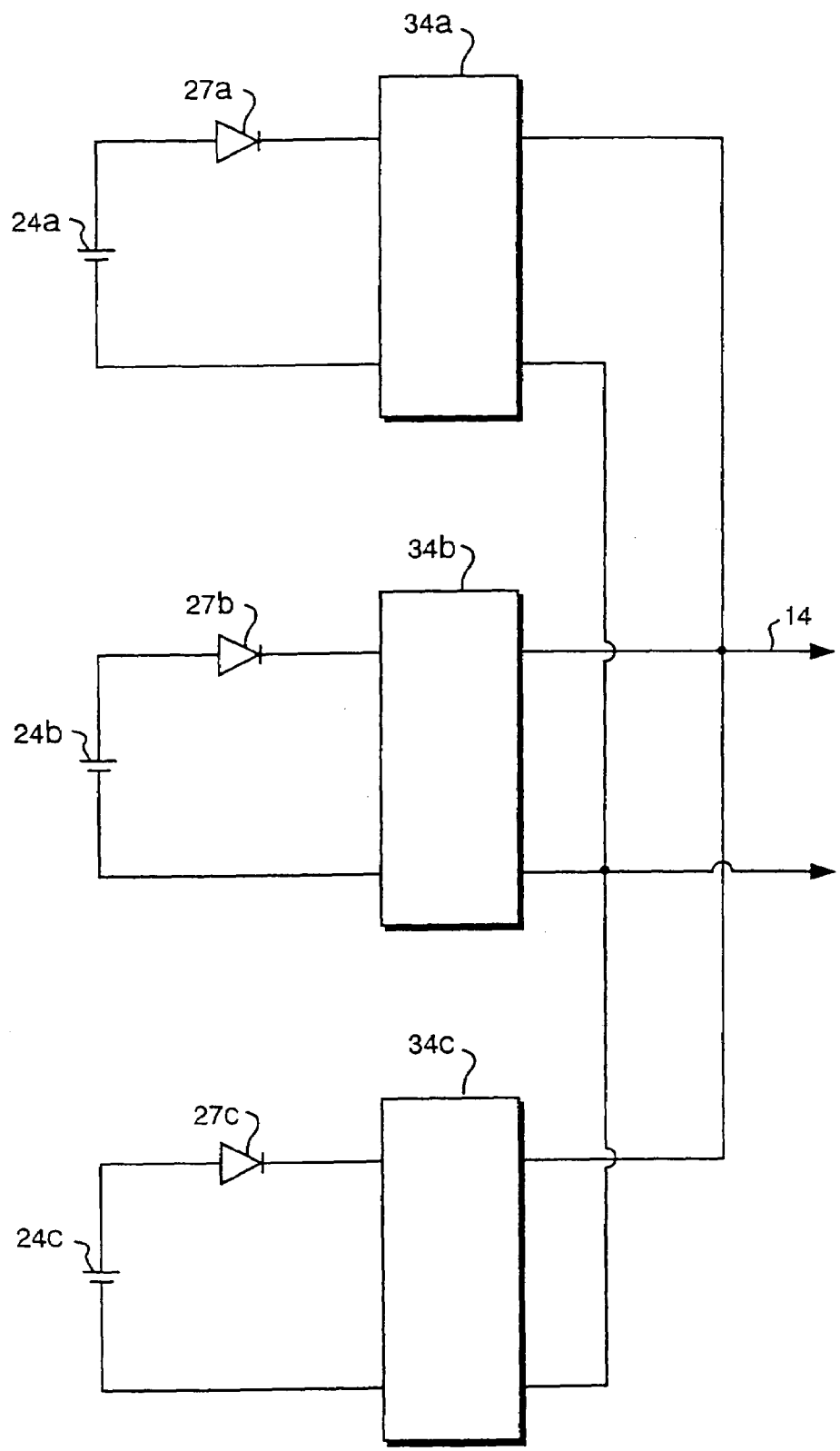
FIG. 8 is a schematic of multiple batteries and boost converters.

Battery 24 may comprise a single battery or a plurality of parallel coupled batteries. Further, it may be desirable to electrically separate multiple batteries and have each such battery connected to the DC link by separate boost converter/diode circuits, i.e., each parallel mechanically rechargeable battery would be connected to the DC link by a corresponding one of a plurality of boost converter circuits 34. Referring briefly to FIG. 8, there is shown one form of multiple battery arrangement in which batteries 24a, 24b and 24c are connected via respective diodes 27a, 27b and 27c to corresponding ones of the converter circuits 34a, 34b and 34c. Each converter circuit has its output terminals connected to the DC link 14. The use of diodes 27a, 27b, and 27c is optional in this embodiment. Multiple batteries and boost converter circuits provide fault tolerance. If one of the batteries malfunctions, disabling the boost converter can be used to effectively remove the defective battery from the assembly.

Figure 4:
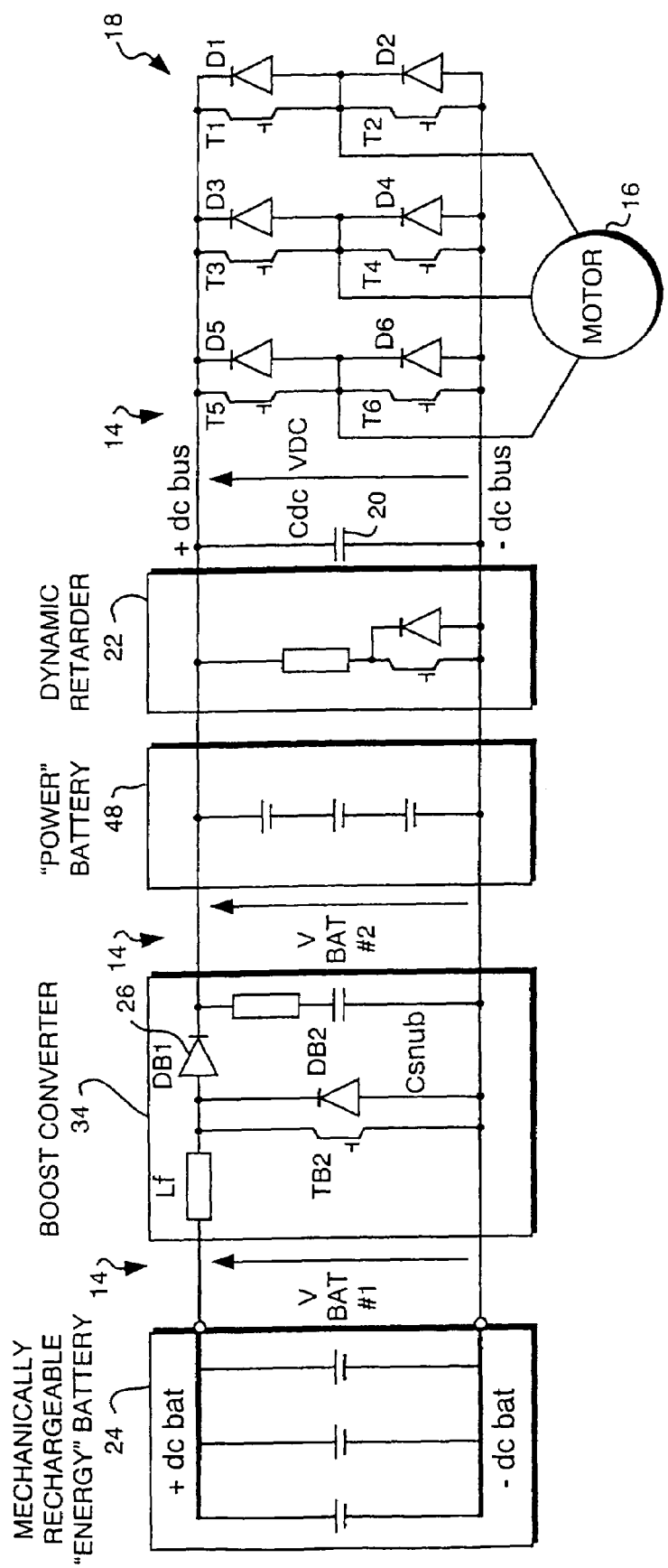
FIG. 4 schematically illustrates a hybrid battery configuration according to still another embodiment of the invention including an AC traction drive with a boost converter control, a dynamic retarder, and two batteries.

FIG. 4 is a still further modification of the embodiment of FIG. 3 and differs from that embodiment in the addition of a high power density battery 48 across the DC link on the inverter side of the blocking diode 26. The embodiment of FIG. 4 creates a hybrid battery configuration that is capable of providing high power response for acceleration or heavy load conditions using the battery 48 while at the same time providing for extended range of operation of the vehicle using the high energy density battery 24. In this embodiment, when the motor is used to effect electrical retarding of the vehicle, the regenerative energy produced by the motor can be transferred to the high power density battery 48 to effectively recharge this battery and extend the operating range of the vehicle. Preferably, the terminal voltage of the high energy density battery 24 is less than the terminal voltage of the high power density battery 48 so that without the boost converter 34, there would be no power flow from the battery 24 to the battery 48. This allows the boost converter 34 to be controlled in a manner to regulate the amount of energy drawn from the battery 24. Energy will be drawn from battery 24 either when power demand by the load is greater than can be supplied by battery 48 or when needed to recharge battery 48 from battery 24.

A specific advantage of the hybrid battery configuration of FIG. 4 is that the control strategy for the boost converter 34 and the dynamic retarder 22 can be such as to allow the DC link voltage to be maintained within a narrow controlled voltage range since the power battery 48 connected across the DC link has a lower effective series resistance and can absorb much of the regenerative power produced by the motor 16. As discussed above, the dynamic retarder circuit 22 can be used to control the DC link voltage to within acceptable levels above the nominal operating voltage of the high power density battery 48. However, this type of voltage control can also be effective in applications in which auxiliary power is taken from the DC link without use of the dynamic retarder 22. For example, in systems in which the DC link power is connected to run lights, air compressor, air conditioner, power steering pumps and other vehicle accessories (not shown), the combination of these accessory loads with the rechargeable battery 48 may provide sufficient capacity to absorb any regenerative energy without use of a dynamic retarder.

Figure 5A:
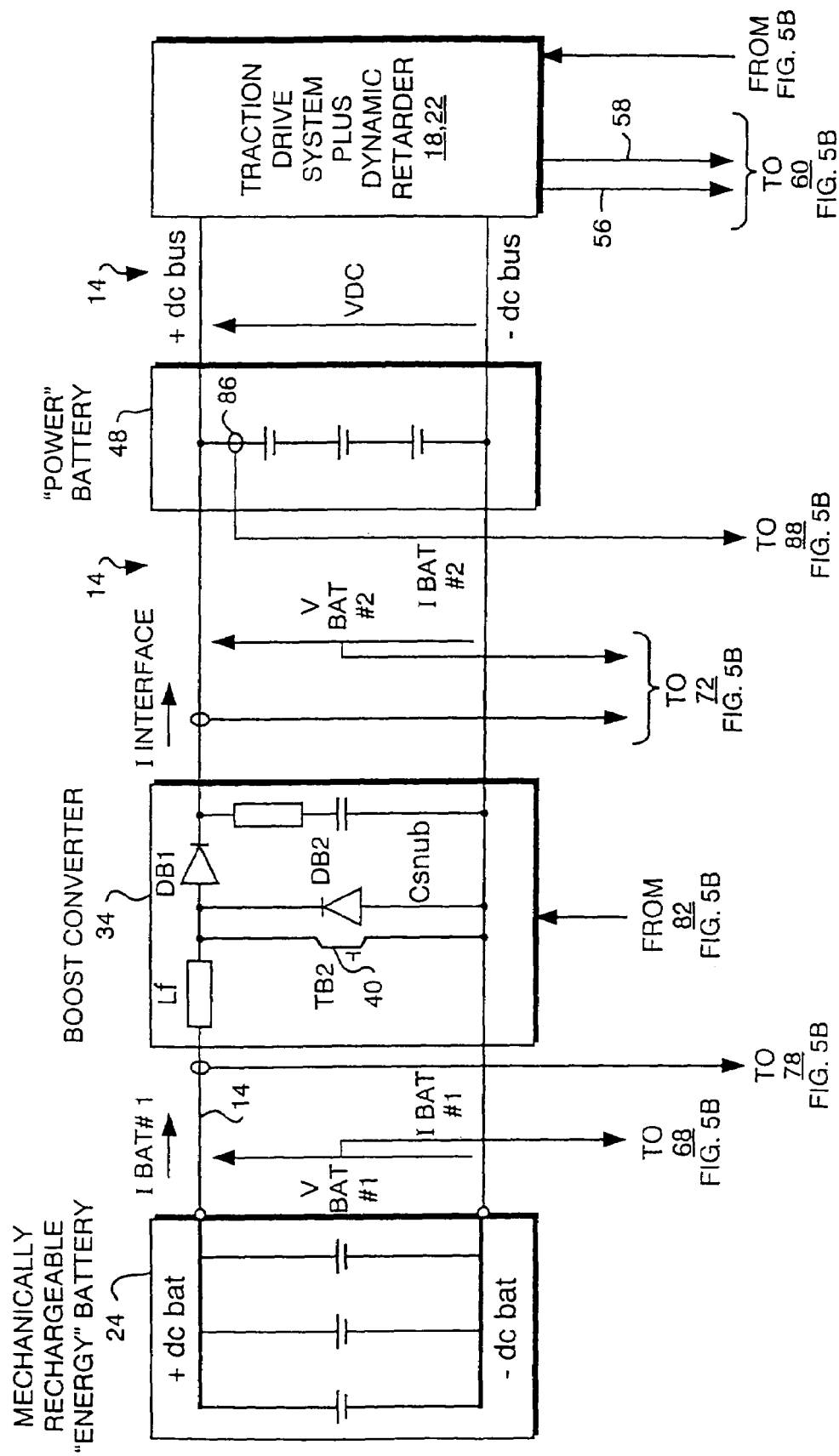
FIG. 5 schematically illustrates a hybrid battery control system according to another embodiment of the present invention.
Figure 5B:
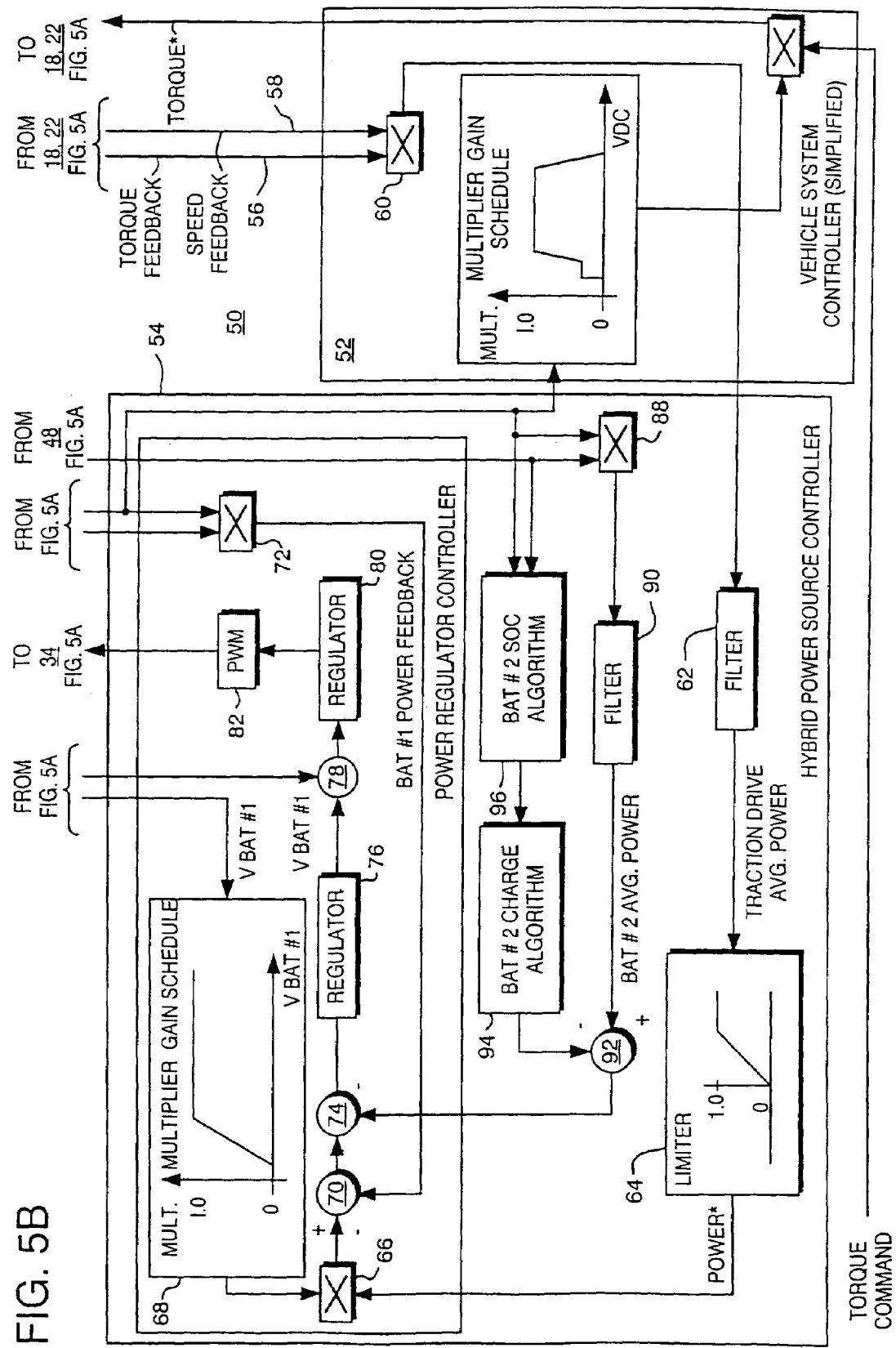

Referring now to FIG. 5, there is shown a functional block diagram of a control system 50 which may be used to control the operation of the hybrid battery traction drive circuit of FIG. 4. The control system is divided into two sections, a vehicle system controller 52 and a hybrid power source controller 54. The system controller 52 essentially monitors motor performance from such variables as torque feedback on line 56 and a speed reference feedback on line 58. A torque command which may be simply an accelerator position is applied to the controller 52 and with appropriate manipulation is output as a torque control command to the traction drive system supplying signals to control the individual switching devices in the inverter 18 and the switching device in the dynamic retarder 22. The development of the switching device signals is not part of the present invention and is well known in the art.

The hybrid power source controller 54 monitors the voltage at the high power density battery 48 and the voltage at the high energy density battery 24 and uses these variables to control the boost converter 34 so as to regulate the amount of power transferred from the battery 24 to the DC link 14. The hybrid power source controller 52 utilizes some of the techniques described in U.S. Pat. No. 5,659,240. In its essential operation, a multiplier 60 in the system controller combines the torque feedback and speed feedback signals to produce a power feedback signal that is coupled through a filter circuit 62 and applied to a power limit circuit 64. The output of the power limit circuit 64 is applied to another multiplier 66 where it is combined with a signal representative of the terminal voltage of the high energy density battery 24. This signal is merely the monitored battery voltage signal applied to a multiplier gain schedule circuit 68 which produces an adjusted multiplier VAC representative of the battery power required by the drive circuit. This value is summed in junction 70 with another feedback signal representative of the actual power being delivered to the high power density battery 48 by monitoring the current to that battery and the voltage thereacross. The product of these values obtained in multiplier 72 as applied to the summing junction 70. The difference signal is then used to control the operation of the boost converter. However, it is first modified by signal representative of the average power being supplied by the battery 48 in summing junction 74. The resulting signal is then applied to the regulator 76 to generate a command representative of desired current from the battery 24. A current feedback signal is combined with this signal in junction 78 and the difference signal is then applied to a regulator 80 which supplies signals to a pulse width modulation signal generating circuit 82. The circuit 82 provides the control signals to the switching device 40 in the boost converter circuit 34. In this manner, the circuit serves to control the amount of energy transferred from the battery 24 onto the DC link 14.

The average power being generated by the battery 48 is obtained by monitoring the battery 48 terminal voltage, and the battery 48 current output at sensor 86. These signals are applied to a multiplier 88 to provide a power signal which is then filtered at block 90 and applied to a summing junction 92. At summing junction 92, the average power from battery 48 is summed with signals obtained by applying a battery state of charge algorithm, box 94 and 96. The state of charge algorithm uses the DC link voltage and the current from battery 48 to compute the net amperes being produced by the battery 48. The algorithm is utilized to control the charge cycles for the battery 48 so as to maximize the life of the battery. A more detailed discussion of the battery state of charge algorithm is provided in U.S. Pat. No. 5,659,240.

Figure 7:
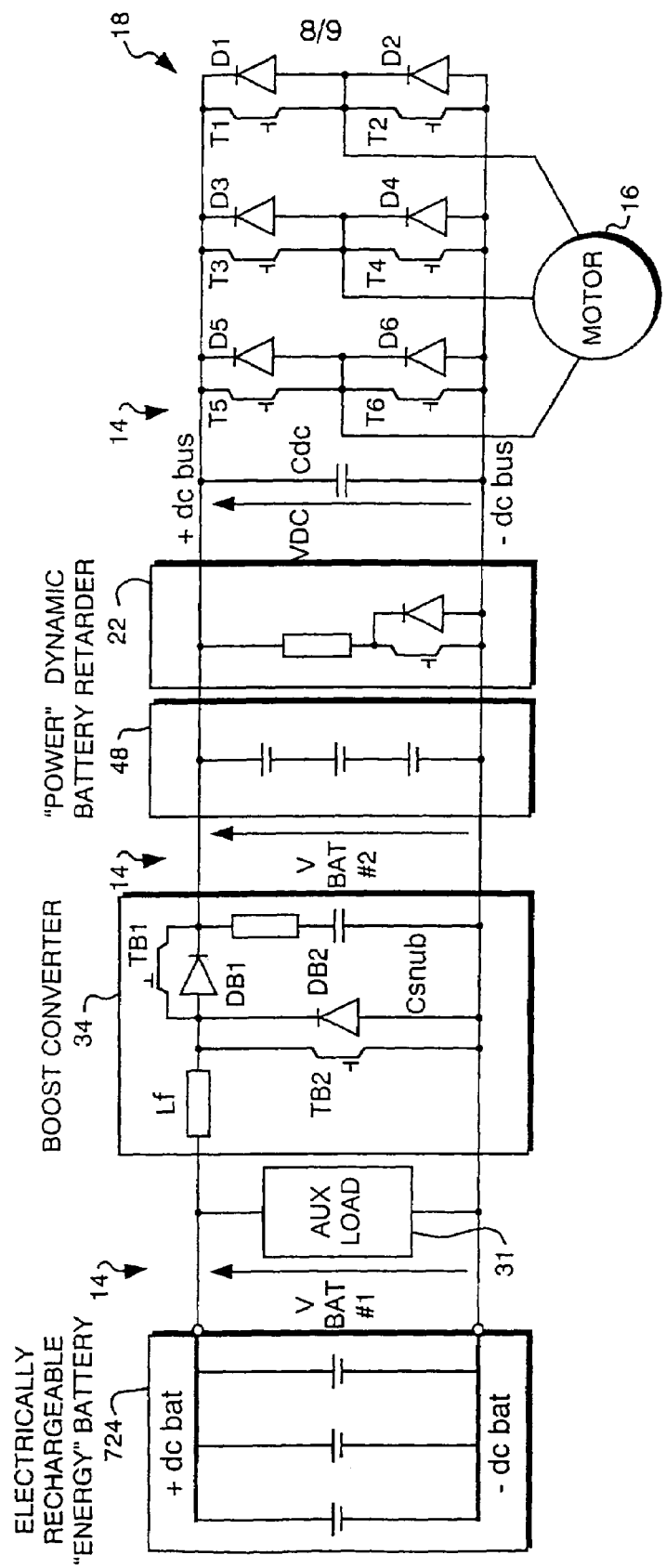
FIG. 7 schematically illustrates a further embodiment of the present invention.

FIG. 7 schematically illustrates a hybrid battery control system according to still another embodiment of the invention including an electrically rechargeable, high energy density battery.

Figure 6:
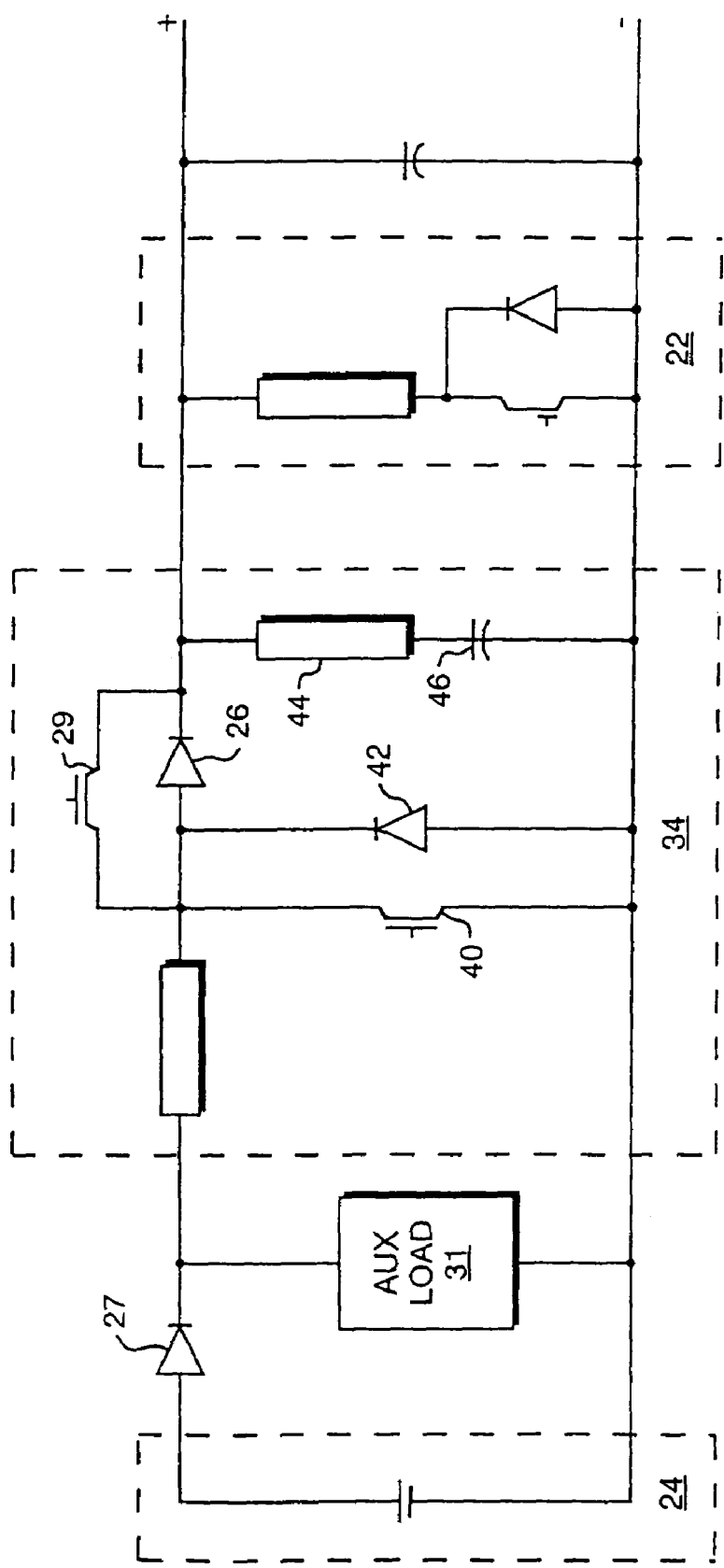
FIG. 6 is a schematic of a modified embodiment of a portion of the drive circuit of FIG. 3.

The embodiment of FIG. 7 is substantially the same as the embodiment of FIG. 6 except for the change in battery 24 and the deletion of the blocking diode 27 which is no longer required since battery 24 can accept recharge electric power.

In this embodiment, battery 24 is an electrically rechargeable battery instead of a mechanically rechargeable battery. Although conventional electrically rechargeable batteries do not have as much energy storage as conventional mechanically rechargeable batteries, an advantage of electrically rechargeable batteries is the fact that they can be recharged in position unlike mechanically rechargeable batteries which must be removed from an EV for recharging. Suitable electrically rechargeable high energy density batteries include, for example, lithium-ion batteries, nickel-metal-hydride batteries, or sodium-nickel-chloride batteries.

While the invention has been disclosed in what is presently considered to be a preferred embodiment, various modifications will become apparent to those skilled in the art. Accordingly, it is intended that the invention not be limited to the specific disclosed embodiment but be interpreted within the full spirit and scope of the appended claims.

The invention claimed is:

1. A hybrid battery arrangement for an electrically powered system in which battery loading is subject to intermittent high power loading, the system including a hybrid battery coupled to supply electric power via a DC link to a load and a control system for controlling application of power to the load, the hybrid battery arrangement comprising:
   a first battery coupled to the DC link, the first battery comprising an electrically rechargeable battery;
   a second battery coupled to the DC link, the first battery having higher energy and lower power densities than the second battery; and
   a boost converter coupled in circuit between the first battery and the second battery for selectively boosting the voltage from the first battery.

2. The hybrid battery arrangement of claim 1 wherein the first battery includes an assembly of first batteries and the boost converter includes a plurality of boost converters, each of the boost converters being coupled between a respective one of the first batteries and the second battery.

3. The hybrid battery arrangement of claim 1 further including a dynamic retarder coupled in circuit between the second battery and the first battery for controlling voltage of the DC link to within selected levels of the nominal operating voltage of the second battery.

4. The hybrid battery arrangement of claim 3 wherein the dynamic retarder comprises the serial combination of a power dissipating resistance and a second switch with the control system operable to selectively gate the second switch into and out of conduction in a manner to control the voltage across the second battery.

5. The hybrid battery arrangement of claim 1 wherein the first battery comprises a sodium-nickel-chloride battery, a lithium-ion battery, a nickle-cadmium battery, or a nickel-metal-hydride battery.

6. The hybrid battery of claim 1 further including a diode serially connected between the first battery and the boost converter, the diode being poled to block current from the boost converter to the first battery.

* * * * *

UNITED STATES PATENT AND TRADEMARK OFFICE
CERTIFICATE OF CORRECTION

| | | |
|---|---|---|
| PATENT NO. | : 7,049,792 B2 | Page 1 of 1 |
| APPLICATION NO. | : 10/823200 | |
| DATED | : May 23, 2006 | |
| INVENTOR(S) | : Robert Dean King | |

It is certified that error appears in the above-identified patent and that said Letters Patent is hereby corrected as shown below:

Col. 8, line 8 (Claim 2), delete "batteries" and substitute therefore -- battery --.

Signed and Sealed this

Thirty-first Day of May, 2011

David J. Kappos
*Director of the United States Patent and Trademark Office*